COLOR RECEIVER UTILIZING VELOCITY MODULATION IN DISPLAY TUBE

Filed June 1, 1954 5 Sheets-Sheet 1

INVENTORS:
VLADIMIR K. ZWORYKIN
JAN A. RAJCHMAN &
EDWARD G. RAMBERG
BY [signature]
ATTORNEY

INVENTORS:
VLADIMIR K. ZWORYKIN
JAN A. RAJCHMAN &
EDWARD G. RAMBERG

BY [signature]
ATTORNEY

INVENTORS
VLADIMIR K. ZWORYKIN
JAN A. RAJCHMAN &
EDWARD G. RAMBERG
BY [signature]
ATTORNEY June 20, 1961 V. K. ZWORYKIN ET AL 2,989,582

COLOR RECEIVER UTILIZING VELOCITY MODULATION IN DISPLAY TUBE

Filed June 1, 1954 5 Sheets-Sheet 4

INVENTORS.
VLADIMIR K. ZWORYKIN
JAN A. RAJCHMAN &
EDWARD G. RAMBERG

BY [signature]
ATTORNEY

INVENTORS:
VLADIMIR K. ZWORYKIN
JAN A. RAJCHMAN &
EDWARD G. RAMBERG
BY
ATTORNEY

United States Patent Office 2,989,582

Patented June 20, 1961

2,989,582
COLOR RECEIVER UTILIZING VELOCITY MODULATION IN DISPLAY TUBE

Vladimir K. Zworykin and Jan A. Rajchman, Princeton, N.J., and Edward G. Ramberg, Huntingdon Valley, Pa., assignors to Radio Corporation of America, a corporation of Delaware Filed June 1, 1954, Ser. No. 433,334
39 Claims. (Cl. 178—5.4)

This invention relates to the operation of line screen color kinescopes, and particularly to the operation of line screen color kinescopes which do not use shadow masks and which employ a (two-sided) electron sensitive screen and velocity modulation control of the electron beam for chroma control.

It has been previously proposed to derive signals from the rear surfaces of a cathode ray screen and to utilize said signals for controlling the focus or the timing of the beam, or for securing linear, vertical, radial or other directional scanning movements of a high order of precision. By way of example, Zworykin, in United States Patent 2,415,059, shows a color kinescope having a screen made up of a multiplicity of groups-of-three phosphor coated lines, each capable of emitting light of a different color, and three photocells at the rear of the screen, each sensitive to one of the colors emitted by the color phosphor lines. The control signals generated by the photocells are employed to accelerate or decelerate the deflection of the beam in accordance with its departure from the phosphor line being scanned. The control signals thus serve to restore the instantaneous line-deflection path of the scanning beam on that phosphor line. The amplitude of the control signals in Zworykin's color kinescope is a function of the intensity of the lights which the photocells pick up from the rear of the screen. It then follows that when any portion of the televised scene contains a relatively dark area, only very weak photoelectric signals are available for control purposes.

In his United States Patent 2,633,547, Harold B. Law describes an improved type of two-sided electron sensitive screen color kinescope in which is employed an electron sensitive target comprising an electron-transparent light-reflecting layer having any desired pattern of color phosphor materials on its obverse face and a discrete electron-transparent signal emissive phosphor material of the desired color-emissive and light-decay characteristics on its opposite or rear surface.

The light emitted by impact of the electron beam is reflected rearwardly by the light reflecting layer and is picked up, as by a photocell, and the resulting signals used, as before, to control the focus or the timing of the beam. Since the light emitted by the signal generating phosphor layer is reflected rearwardly, and is not visible from the front of the tube, it may have color and excitation-amplitude versus time decay characteristics other than that of the phosphor or phosphors on the obverse face of the screen. With such a system, control signals are available irrespective of the instantaneous degree of light and shade of the televised image.

In the tube utilizing principles taught by both Zworykin and Law, provisions are made for controlling the electron beam in intensity relative to the instantaneous color information prescribed by the color image. This involves problems of electron beam density control and focus, extreme accuracy in timing, and general problems of electron optics normally associated with electron beam systems which involve both deflection and density control. The chief objective of electron beam density control in tubes of the type involving principles taught by Zworykin and Law involves the variation of light output of the phosphor as a function of the number of electrons striking the phosphors at a particular time.

The present invention involves a new and novel approach to control of phosphor light output in electron sensitive screen type of color kinescope or image reproducer; it recognizes the fact that the light output from a phosphor under electron bombardment may be also varied by controlling the amount of time that an electron beam of relatively constant density bombards the phosphor rather than the number of electrons which are caused to strike the phosphors and also their particular velocity.

One major object of this invention is therefore to provide a line screen color kinescope which employs the principle of velocity modulation to achieve proper color rendition.

Another object of this invention is to provide a line screen color kinescope which uses signal strips which provide automatic registration with respect to the color phosphor lines and which utilizes velocity modulation control of the electron beam for color rendition.

Yet another object of this invention is to provide a single gun color kinescope which can be used for color image reproduction without the necessity of varying the electron beam intensity.

Yet another object of this invention is to provide a line screen color kinescope which is controlled by signals from suitably placed signal strips to distribute the times during which the electron beam rests on the lines of a color phosphor line trio.

Yet a further object of this invention is to provide a color image reproducer wherein the electron beam is modulated by the luminance signal, and remains on successive color lines for periods proportional to the relative magnitudes of the three color components.

Yet another object of this invention is to provide a signal-strip-triggered line screen color kinescope wherein the electron beam is maintained at maximum intensity and which utilizes velocity modulation to achieve color rendition.

According to this invention, the electron beam in a color kinescope is velocity modulated to achieve the proper color rendition.

In one form of the invention, the electron beam is modulated by the luminance signal and is caused to remain on successive color lines for periods proportional to the relative magnitude of the three color components.

In another form of the invention, the electron beam intensity is maintained at fixed maximum intensity and remains on successive color lines for periods proportional to the absolute magnitude of the three color components.

In yet another form of the invention, the principle of utilizing velocity modulation for proper color rendition may be employed in a line screen type color kinescope which utilizes signal strips for electron beam position identification or which employs the general principles of the "two-sided" electron sensitive screen approach for permitting synchronization between the color circuits and the position of the electron beam.

Other and incidental objects of the invention will become apparent upon a reading of the following specification and an inspection of the drawings in which.

Figures 1, 2, 3:
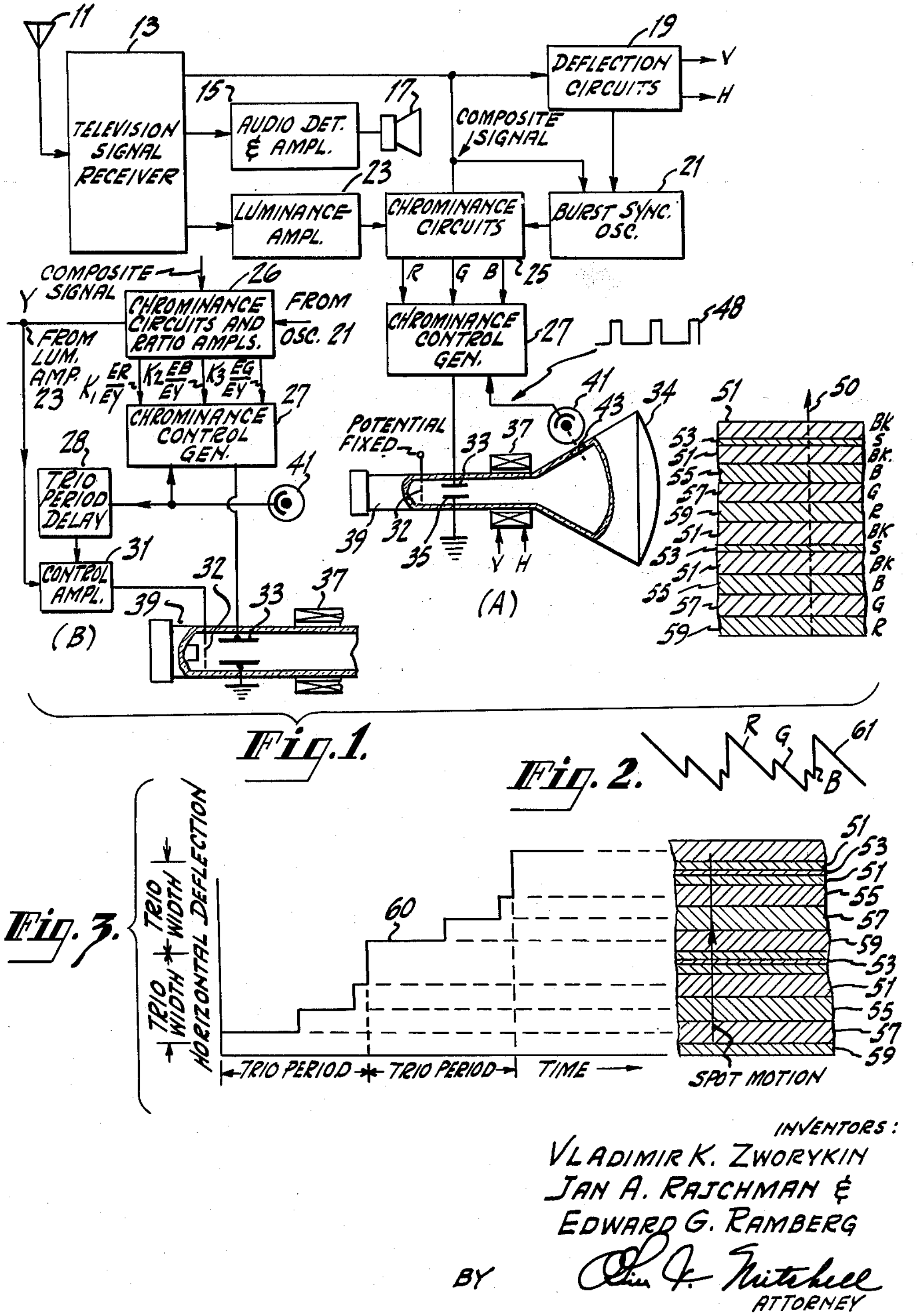
FIGURE 1 shows a color television receiver system which employs one form of the present invention.
FIGURE 2 shows the signal on the auxiliary horizontal deflection plates as derived from a chrominance signal generator.
FIGURE 3 shows the relationship between the horizontal deflection and the trio period for a tube with vertical color lines.

A color image reproducing tube employing the principles of the present invention is distinguished by simplicity in manufacture and operation. These distinguishing features may be listed as follows: A. The employment of a single gun, either modulated by the luminance signal or unmodulated; B. The employment of a phosphor line screen with large manufacturing tolerances, incorporating signal strips registered with the phosphor lines. The signals derived from these strips control the beam position in the adjoining trios with relation to the color signals; C. The employment of an auxiliary deflection system derived from the three color signals and triggered or phase controlled by the signals from the signal strips to distribute the times during which the beam rests on the line of the phosphor line trio in accord with the magnitudes of the color components in the transmitted video signal.

The color image reproducer which embodies the teachings of the present invention has in common with the two-sided electron sensitive screen color reproducer described by Harold B. Law, the use of a single gun and of a line screen with signal strips which does not have to be mechanically registered with other parts of the tube. However, whereas in Law's tube, the beam remains on each color line for an equal time, during which time the control grid of the gun samples the corresponding color signal, the color tube employing the teachings of the present invention utilizes the principles of velocity modulation to achieve the proper color rendition. As has been already described, the beam is either modulated by the luminance signal and remains on successive color lines for periods proportional to the relative magnitude of the three color components or maintained at fixed maximum intensity and remains on successive color lines for periods proportional to the absolute magnitude of the three color components. The last approach may be regarded as a system for complete velocity modulation for both luminance and chrominance. During the fraction of each trio period during which the luminance is to be suppressed, and this may be large for dark portions of the picture, the beam remains on a portion of the screen which is not coated with phosphor. It is important to note, however, that there are other modifications or approaches which can also be utilized, such as the approach of turning off the electron beam when it completes its trio of phosphor lines but before it is permitted to be triggered to the next trio of phosphor lines.

The present invention can be realized with line screens whose lines are parallel to the scanning lines (horizontal lines) and also with line screens whose lines are perpendicular to the scanning lines (vertical lines). The signal strips may provide the phasing signals either by electron collection or emission or by light emission which actuates a suitably placed phototube. Furthermore, these phasing signals may either initiate a sequence of deflection signals for a single trio or be employed to correct the main deflection so that arrival at the start of a trio coincides with the proper phase of the color signal.

The simplest system is that in which the conversion efficiencies of the three phosphors are equal. Then the times during which the spot remains on each phosphor line in a trio are proportion to $K_1E_R/E_Y$, $k_2E_G/E_Y$, $k_3E_B/E_Y$, where $E_R$, $E_G$, $E_B$ are the three (linearized) color signals, $k_1$, $k_2$, $k_3$ the relative luminosities of the three primaries, and $E_Y=k_1E_R+k_2E_G+k_3E_B$. Thus the sum of the times during which the beam rests on the phosphor lines in a trio is the same for all colors and, except for a brief interval reserved for the generation of the signal strip signals, the beam power is completely utilized. The same applies if, instead of the luminance signal $E_Y$, the signal $$E_M=\frac{1}{3}E_R+\frac{1}{3}E_G+\frac{1}{3}E_B$$

modulates the scanning beam and the conversion efficiences of the three phosphors are proportional to $k_1$, $k_2$, and $k_3$, respectively. The times during which the spot remains on each phosphor line in a trio are then proportional to $E_R/E_M$, $E_G/E_M$, and $E_B/E_M$.

Before continuing with a discussion of the embodiments and circuitry associated with the present invention, consider first some of the pertinent aspects of a color television receiver which can be adapted to utilize the present invention. One such circuit is shown in FIGURE 1A. Here, the television signal is received at the antenna 11 and is applied to the television signal receiver 13 where the television signal information and the sound information are recovered. The operation of the television signal receiver 13 is well known, involving such processes as radio frequency amplification, first detection, intermediate frequency amplification and second detection and including such processes as automatic gain control. These and other aspects of television signal receiver operation are discussed in, for example, Chapter 22 of C. Louis Cuccia's "Harmonics Sidebands and Transients in Communication Engineering" published by McGraw-Hill in 1952.

At the output of the television signal receiver 13, the audio information is applied to the audio detector and amplifier 15 which recovers the audio signal using, for example, the well known principles of intercarrier sound. The recovered audio signal is then applied to the loud speaker 17.

The television signal receiver 13 applies the recovered television signal to the deflection circuits 19 which provide the horizontal and vertical scanning voltages which are applied to the yokes 37 which provide deflection of the electron beam in the kinescope 39. The television signal is also applied to the chrominance circuits 25.

The television receiver must have its color circuits synchronized with the master oscillator at the transmitter. To provide this function, approximately 8 cycles of a color synchronizing burst are included on the back porch of the horizontal synchronizing pulse in the television signal. This color synchronizing burst has a frequency of approximately 3.58 megacycles and is accurately phased with respect to the color information which is contained in the color television signal so that the color information at prescribed colors can be recovered by the processes of synchronous detection. The television signal is therefore injected into the burst synchronized oscillator circuit 21 which is also subjected to a gating signal from the deflection circuits 19 so that the color synchronizing burst can be separated from the television signal and utilized to synchronize the burst synchronized oscillator 21 into correct phase. The output of the burst synchronized oscillator is injected into the chrominance circuits 25.

The television signal receiver 13 provides a television signal to the luminance amplifier which in turn supplies a luminance signal to the chrominance circuits 25. By the processes of synchronous detection, signal inversion and matrixing, and nonlinear amplification, the chrominance circuits 25 yield the recovered red, green and blue signals.

The red, green and blue signals as provided by the chrominance circuits 25 are supplied to the chrominance control circuits 27 which are triggered by the photosensitive tube 41 in response to the electron beam in the color kinescope 39 striking the signal strips 53 on the inner kinescope face.

The phosphor strips on the face of the color kinescope 39, as shown in FIGURE 1A include not only the signal strips 53 but also blank strips 51 and color phosphor strips including red phosphor strips 59, green phosphor strips 57 and blue phosphor strips 55. The purpose of the invention as embodied in FIGURE 1A is that following synchronization by a signal strip 53, the succeeding red, green and blue phosphor lines will be subjected to electron bombardment for periods determined by the chrominance and luminance information represented by each of these colors. The chrominance control generator, subject to synchronization by the signal-strips response of the photosensitive tube 41, is adapted to accept the red, green and blue signals provided by the chrominance circuits 25 and translate this color information into beam-scan-velocity signals which will properly successively actuate the electron beam on the color phosphor strips when these signals are applied to the deflection plates 33 and 35 which operate in conjunction with the deflection yokes 37.

The electron beam of constant intensity is caused to be deflected transversely along the strips of phosphors and signal strips along, for example, the path 50; when the electron beam comes into contact first with the signal strip 53, light of suitable spectral characteristics is emitted backwards into the kinescope and through the window 43 to the photocell 41 where a triggering signal 48 is applied to the chrominance control generator 25. This triggering signal 48 is used to produce a control of the deflection of the electron beam whereby the chrominance control generator 25 supplies beam-scan-velocity information relating to each of the three phosphors in sequence to the deflection plates 33 and 35 which operate in conjunction with the deflection yokes 37 so that the amount of time that the electron beam remains on each of the color phosphor strips will be proportional to the chroma involved. The precise circuits which may be employed for this beam-scan-velocity control will be discussed later in these specifications.

A modification of the embodiment of the present invention as shown in FIGURE 1A is shown in FIGURE 1B. Here, luminance signal control of the electron gun of the color kinescope 39 is included. In the system in FIGURE 1B, the television signal receiver 13 provides a television signal to the luminance amplifier 23. The luminance amplifier 23 impresses a luminance signal on both the chrominance circuits and the ratio amplifier 26 and the control amplifier 31 which provides a signal to the control grid of the kinescope 39.

The chrominance circuits and ratio amplifier 26, receiving the luminance signal from the luminance amplifier 23, the television signal from the television signal receiver 13 and the burst synchronized oscillator 21, cause the formation of the ratios $k_1E_R/E_Y$, $k_2E_G/E_Y$ and $k_3E_B/E_Y$. These ratios are applied to the chrominance control generator 27 which translates these ratios into deflection control signals which control the amount of time the electron beam remains on each phosphor line of the color kinescope 39, these signals being impressed on the deflection plates 33 and 35 which work in conjunction with the action of the deflection yoke 37. Simultaneous with these ratio signals applied to the deflection plates 33 and 35, the luminance signal, as synchronized by the action of the photosensitive tube 41 which supplies the triggering pulses 48 through the trio period delay 28 to the control amplifier 31, yields the luminance information to the electron gun control grid 32 to complete the control of the electron beam so that a color image of high fidelity may be realized.

The deflection 61 of the beam in a system with vertical lines and one signal strip per trio is shown, for equal phosphor conversion efficiencies, in FIGURE 2. The transition from one color line to the next is drawn as shown in FIGURE 3 as though it were instantaneous; in practice it will be made as rapid as circuit design will permit. In effect the beam follows the step-relationship 60 shown in FIGURE 3 wherein the beam remains at rest on each color line for a time proportional to the ratio of the contribution to the luminance of the corresponding color component to the total luminance and then proceeds to the next color line. This can be accomplished, for example, by employing circuitry whereby as the beam approaches one of the signal strips, a large pulse is caused to be superposed on the video signal; this pulse is made so large that the signal is limited by the final video amplifier, giving a large, constant intensity irrespective of the video signal. This produces a timing pulse of constant amplitude as the beam meets the signal strip, which initiates the set of three saw-tooth waves applied to a set of auxiliary deflection plates, which hold the beam in fixed position for the appropriate time on the three color strips.

Figure 4:
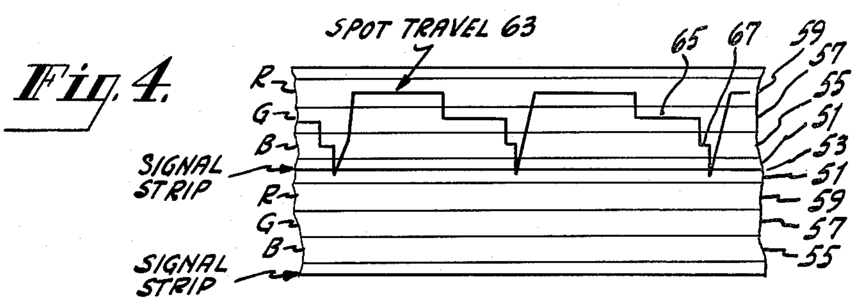
FIGURE 4 shows the nature of the signal applied to auxiliary vertical deflection plates as a function of time for a tube with equal phosphor conversion efficiency.

With horizontal color lines (still with equal phosphor conversion efficiencies) the scanning spot, under the influence of the main deflection field and a superposed deflection at right angles effected by the pair of auxiliary plates 33 and 35, travels along a "staircase" path 63 as shown in FIGURE 4. When the beam strikes the low signal strip 53 of a trio, the timing pulse generated returns it to e.g. the center of the red line 59 above, where it remains for a time corresponding to the red color component, after which time it shifts to the green line 57 and then to the blue line 55 and finally to the lower signal strip 53, which returns it to the red line 59. Here the main deflection field is not controlled by the timing pulses. At the start of each scan there is no signal across the auxiliary deflection plates and the fact that the vertical deflection is changed by a scanning line width determines the trio on which the spot will travel. If the scanning line separation corresponds to the trio width, each trio is scanned once. If there is no simple relationship between the two, some trios may be scanned several times (trio width greater than scanning line separation) or some trios will not be scanned at all (trio width less than scanning line separation). It is clear that the vertical resolution will be limited by the trio width in similar manner as by the scanning line separation.

With vertical color line scanning, the horizontal resolution is limited by the trio width unless the latter is smaller than a picture element width. This is clear since the spot, for e.g. a green picture, jumps from one green line to the next.

If the conversion efficiencies are made proportional to the luminosities of the three phosphors required to produce white, a condition aimed at in present tri-color kinescopes, the total time for which the beam rests on the phosphor lines in a trio depends on the transmitted color. Here the fractions of the trio period $T-T_S$ allocated to picture reproduction for which the beam rests on the three color lines are proportional to $E_R/E_Y$, $E_G/E_Y$, $E_B/E_Y$; T is here the total trio period and $T_s$ a portion thereof reserved for the transmission of the timing signals, during which time no signal (with vertical lines) is applied to the auxiliary plates. Since $E_R+E_G+E_B=kE_Y$, where $k$ is a general constant, the total time for which the beam is on the phosphor strips differs for different transmitted colors. For low-luminosity colors, such as, to take the most extreme case, saturated blue, the beam must remain on the phosphor strips materially longer than for high-luminosity colors, such as green or white. The optimum is obtained if, for saturated blue, the beam remains on the blue line for the full time $T-T_s$. For the same maximum beam intensity and equal maximum illumination (white) of the scene, the times for which the beam dwells on the color lines and the reproduced brightness if given by the follow tabulation:

| | Blue | Red | Green | White |
|---|---|---|---|---|
| $E_Y$ | $k_3$ | $k_1$ | $k_2$ | 1.00. |
| Time on color lines. | (0, 0, 1) | $(k_3/k_1 0, 0)$ | $(0, k_3/k_2, 0)$ | $(k_3, k_3, k_3)$. |
| Luminance | $k_3^2$<br>0.0121 | $k_1k_3$<br>0.033 | $k_2k_3$<br>0.0649 | $k_3$.<br>0.11. |

This may be compared with the corresponding quantities in the tube described by Harold B. Law, for the same maximum beam current

| | Blue | Red | Green | White |
|---|---|---|---|---|
| $(E_R, E_G, E_B)$ | (0, 0, 1) | (1, 0, 0) | (0, 1, 0) | (1, 1, 1). |
| Time on color lines | (0, 0, 1/3) | (1/3, 0, 0) | (0, 1/3, 0) | (1/3, 1/3, 1/3). |
| Luminance | $k_3/3$<br>0.037 | $k_1/3$<br>0.10 | $k_2/3$<br>0.197 | 1/3.<br>0.33. |

The second system thus gives greater maximum brightness than the first by a factor $1/(3k_3)=3$, assuming normal conditions of illumination. For special objects (light sources, fluorescent paints) with high brightness and saturation the first system can reproduce actually higher brightness values.

Figure 5:
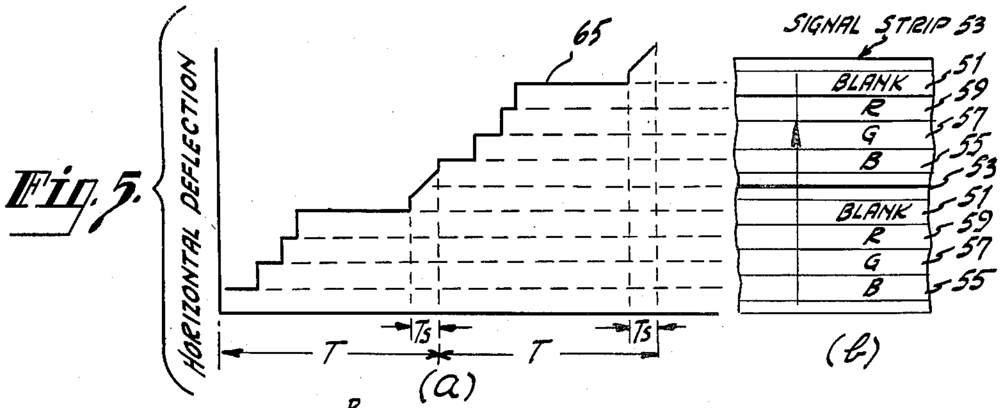
FIGURE 5 shows the relationship between the horizontal deflection of the electron beam and the trio period for a vertical color line tube with unequal phosphor conversion efficiency.
Figure 6:
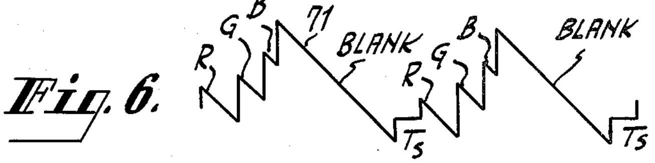
FIGURE 6 shows the signal on the auxiliary horizontal deflection plates as derived from the chrominance signal generator for a vertical color line tube with unequal phosphor conversion efficiency.
Figure 7:
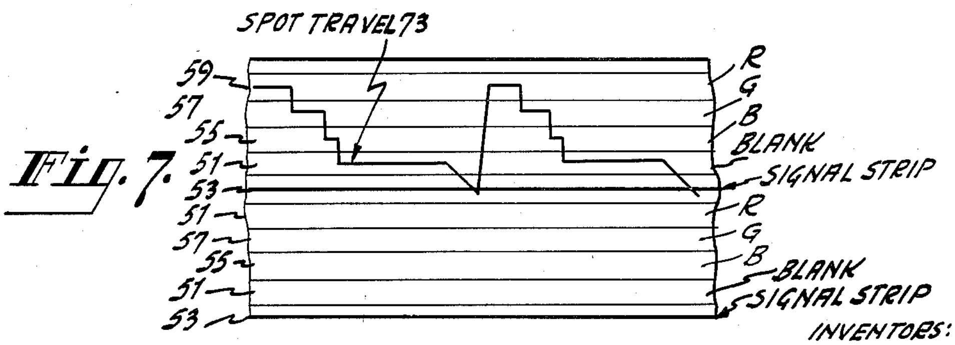
FIGURE 7 shows the spot travel and deflection signal for a tube with horizontal color lines and having unequal phosphor conversion efficiency.

The example of conversion efficiencies proportional to $k_1$, $k_2$, $k_3$ differs from that of equal conversion efficiencies primarily in requiring, in general, a prolonged period during which the beam does not excite any phosphor; for white this is about ⅔ of the total time available. Accordingly, the required deflection wave shapes and the spot travel differ from those shown in FIGURES 2 and 3 and are shown in FIGURES 5 and 6. FIGS. 5 and 6 show the spot travel 65 and the required deflection wave shape 71 for the case of a vertical line color kinescope; a spot travel 73 for the case of a horizontal line kinescope is shown in FIG. 7. Apart from this, the circuitry and tube construction are essentially the same as for equal conversion efficiencies of the phosphors.

The system is considerably simplified if the gun generates a beam of constant (maximum) amplitude and both the luminance and the color are determined by the periods for which the beam rests on the successive phosphor lines of a trio.

Assume conversion efficiencies proportional to $k_1$, $k_2$, $k_3$. The times during which the beam rests on the successive phosphor lines are made simply proportional to $E_R$, $E_G$, $E_B$, the constant of proportionality being chosen so that for maximum brightness white the beam is on each phosphor line for a time $(T-T_s)/3$. The maximum luminance for this type of operation is the same as for the tube proposed by Harold B. Law. Furthermore, since the beam is at constant maximum intensity, it is not necessary to apply a pulse to the gun at the approximate time that the beam sweeps across the signal strip. Such an approach yields the following three simplifications:

A. No luminance signal on gun

B. No intensifying pulses on gun

C. No networks needed for deriving $E_R/E_Y$ etc. from $E_R$, $E_G$, $E_B$.

The circuits are the same as for the systems described before and the wave shapes have the same character as in FIGURES 5, 6 and 7.

The system employing the unmodulated gun has the disadvantage in that it renders the achievement of high contrast extremely difficult; this is characteristic of velocity modulation systems in which the intensity depends on the time of transit of the beam. For a contrast ratio of 100:1 the velocity of transit in the dark portions of the picture has to be 100 times as great as the velocity of transit in the bright portions. Furthermore, the saw-tooth in darker portions of the picture becomes an extremely high frequency signal which is difficult to generate. It may be noted, however, that if a luminance signal $E_Y'$ or a signal derived therefrom, with less contrast, is applied to the gun grid without other changes in the system, the contrast difficulty may be remedied, at least in part, without any falsification of the transmitted colors.

It may be noted that it may prove generally convenient to make the delay between the signal strip pickup and the auxiliary deflection plates equal to a full trio period. This is permissible with the luminance signal on the gun, since chrominance resolution may be considerably less than luminance resolution. It leads to no error whatsoever where the complete video signal is delayed by the times during which the beam remains on the individual color trios.

Some preferred realizations of the components of the system described above are indicated as follows:

Since registration of the screen with other parts of the tube is not required, the screen may be easily prepared. The red, green, and blue phosphor lines may be printed on thin plastic sheet, which is then overlaid with e.g. 1-micron thick aluminum sheet on which the signal strip lines (e.g. uv-emitting phosphor) are printed. The compound sheet may then be squeezed onto the inner surface of the face plate of the kinescope, whose surface is preferably cylindrical and may be coated with a suitable adhesive such as sodium silicate. The plastic sheet is removed by baking, leaving the line phosphor screen coated with aluminum and registered with the uv-emitting signal strips on the aluminum.

With the ultraviolet signal strips 53 the pickup device 41 is, appropriately, an ultraviolet-sensitive multiplier phototube viewing the back of the screen. As an alternative, a uv-sensitive coating may be applied to the conducting coating of the tube bulb and the photocurrent gathered by a positively biased collector. If, instead, the secondary emission characteristics of the signal strip are utilized to generate the signal, the latter may be obtained from a lead connected directly to the signal strips or a suitable collector.

Note that it is possible either to generate a periodic signal whose shape is governed by the color components of the video signal and whose phase is established by phase comparison with the sequence of signal strip signals or to trigger the auxiliary deflection signal for each trio by a single signal strip signal.

Consider now the details of circuits which may be employed for luminance and chroma modulation by scanning velocity control. A circuit which utilizes velocity modulation for luminance and chroma control in kinescopes employing vertical color strips is shown in FIGURE 8.

The conventional magnetic horizontal deflection is supplemented by an electrostatic deflection due to the deflection plates 33 and 35 over a very small angle. This deflection controls the luminance and chromaticity at each line trio by velocity modulation. The beam is "arrested" on each of the color strips for times $t_R$, $t_G$ and $t_B$ which are proportional to the $E_R$, $E_G$ and $E_B$ color signals. For a "black" element the beam stays in a region near the signal strip where there are no color phosphors and rushes through the trio to the corresponding place in the next trio at very high speed. For a "white" element the beam spends suitable times on the 3 phosphor strips where it is "arrested" in succession. For a high intensity monocolor, e.g. red, the beam is arrested, one third of the time spent for "white," on the red strip, and rushes through all other strips. For a low intensity monocolor, the beam spends a short fraction of the time spent for "white" on its strip while the beam rushes through all other color strips. For any particular chromaticity and luminance the beam spends the appropriate $t_R$, $t_G$, $t_B$ times on the color strips.

Figure 8:
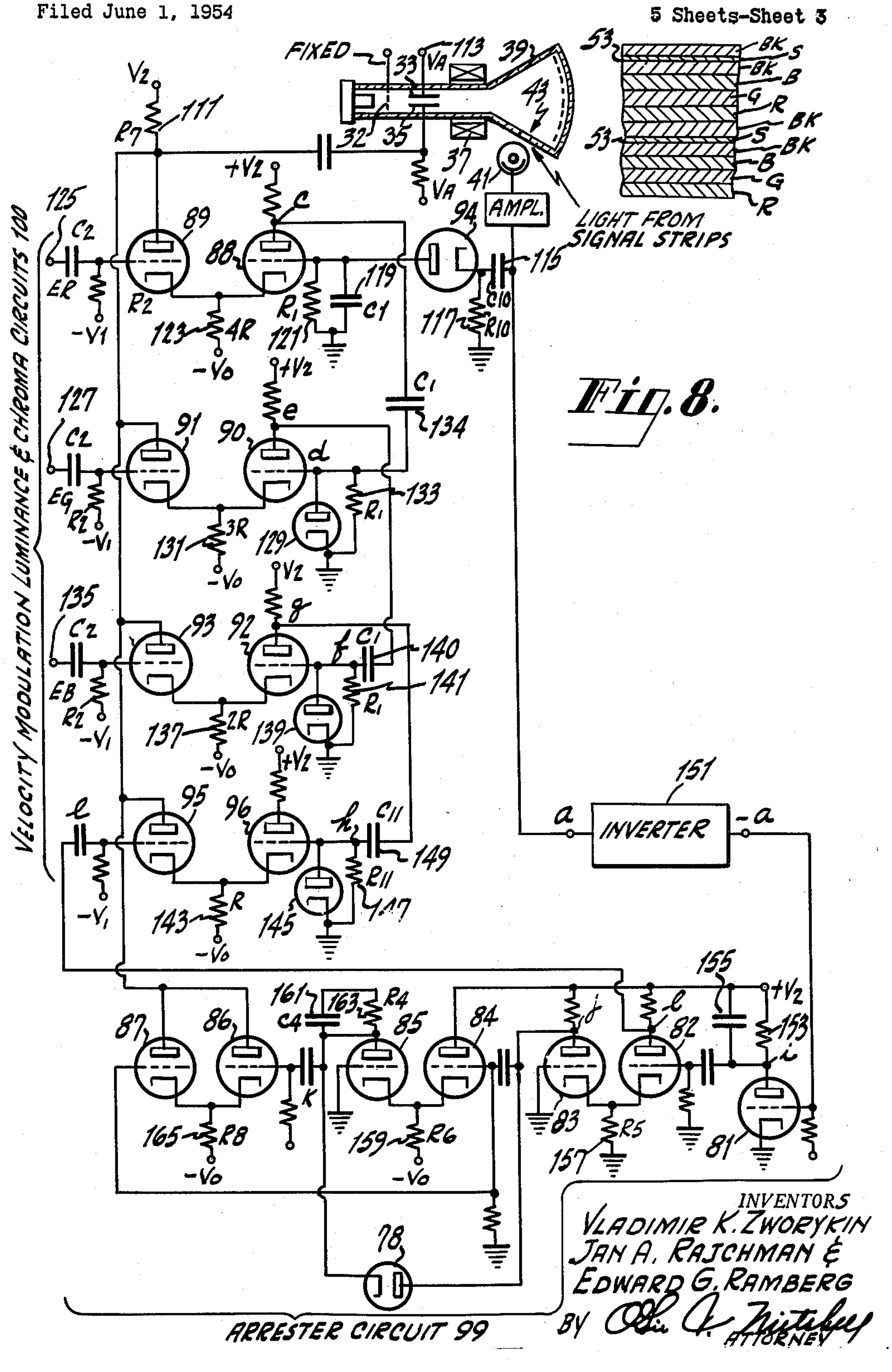
FIGURE 8 shows the schematic diagram of a means for beam-scanning velocity modulation of a fixed intensity beam on a color kinescope having vertical color lines.

In FIGURE 8, there are two essential parts of the chrominance control generator 27; an arrester circuit 99 which precisely counteracts, by electrostatic deflection, the magnetic deflection, and a velocity modulation luminance and chroma circuit 100. Both circuits are triggered from a pulse *a* (FIGURE 9) obtained from a photosensitive tube 41 illuminated by the light signal derived from the passage of the constant intensity beam over the signal strips 53 on the face of the color kinescope 39. This pulse "*a*" is assumed to be of short duration and may be sharpened by highly non-linear expanding amplification.

Complete understanding of the operation of the chrominance control generator 27 can only be achieved by a study of the waveforms produced in the various component circuits in addition to a study of the component circuits themselves. In order to facilitate the understanding, the waveforms produced at key terminals and points in the chrominance control generator 27 are drawn in FIGURE 9 utilizing letter designations corresponding to these key terminals and points.

The arrester circuit 99 operates as follows: by use of the inverter 151 the inverted *a* signal becomes $-a$ and is applied to the grid circuit of tube 81. The plate circuit of tube 81 has a resistor 153 and a condenser 155 whose time constant is chosen to be almost equal, but somewhat shorter than the time required to traverse a color line triplet, e.g. $3\times10^{-7}$ seconds. Tube 82 is not conducting during the time point *i* is relatively negative, so that the current $V_0/R_5$ flows through tube 83 during that time. In the pair of tubes 2 and 3 the standard current flows through tubes 82 or 83, the intermediary condition when both tubes 82 and 83 are conducting being negligible with sufficient excursion of plate voltage of tube 81. The negative excursion of the voltage on the plate of tube 83, point *j*, cuts off tube 84, and forces the standard current $V_0/R_6$ through tube 85. This charges condenser $C_4$ 161 nearly linearly, the time constant $C_4R_4$ as determined by the resistor 163 and the condenser 161 being relatively long. Consequently the current flowing through resistance $R_7$ 111 from tubes 86 and 87 will diminish at a linear rate. Tube 87 is cut off because its grids is coupled to the grid of tube 84, while tube 86 has a gradually decaying grid voltage. The sense of deflection of the electrostatic plate coupled to resistance $R_7$ 111 is so chosen that this deflection tends to counteract the magnetic deflection. Resistances 111, 159 and 165 and voltage $V_0$ and condenser $C_4$ 163 determine the rate of decay of the current in $R_7$ 111 to develop a voltage across deflection plates 33 and 35 so as to counteract the magnetic deflection perfectly and to arrest the beam at whatever position it is set by the arrester circuit 99. When tube 83 ceases to conduct, the positive raise of potential at point *j* causes the condenser $C_4$ 163 to be suddenly discharged by the action of the coupling diode 78. The current through $R_7$ 111 is reestablished immediately through the action of tube 87. This rise of current can thus be extremely rapid, with a large enough tube 87, since it is not controlled by the discharge of $C_4$ 163. Of course the discharge of $C_4$ 163 is relatively fast anyway so as to allow proper current control for the next strip.

Figure 9:
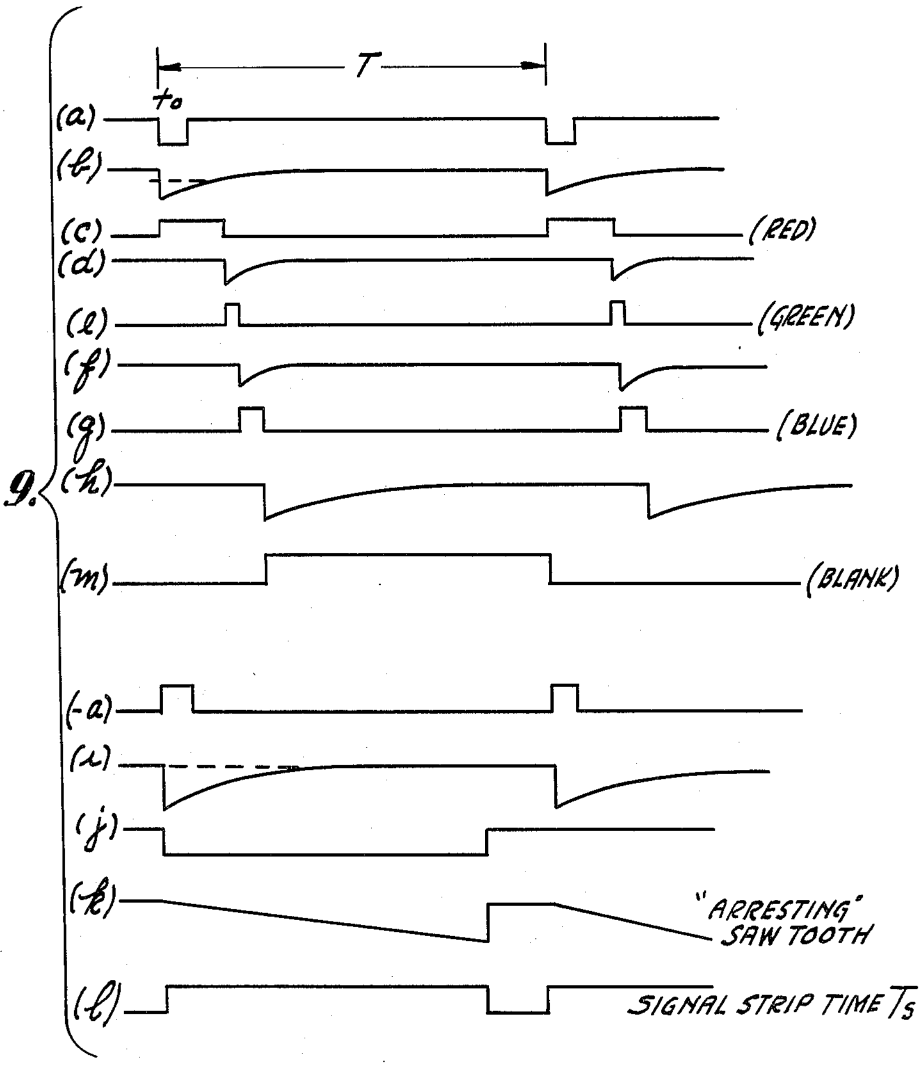
FIGURE 9 shows the waveforms and voltage shapes at corresponding points in FIGURE 8; and, FIGURE 10 shows a schematic diagram of a circuit for modulation by beam-scanning deflection in a color kinescope having horizontal color lines.

The velocity modulation luminance and chroma circuits 100 can now be considered to operate on a "stationary" spot. Staircase voltages must be generated by this circuit, which, when mixed with the spot-arresting signal in $R_7$ 111, produce the required saw-tooth control voltages. To produce these the output of the photosensitive tube 41, after proper non-linear expanding-sharpening amplification, is also coupled to the grid of tube 88. The coupling is through a diode 94 and a time constant circuit $R_1C_1$ yielded by the condenser 119 and the resistor 121. At trigger time $t_0$ as shown in FIGURE 9 the points *a* and *b* drop suddenly in potential by a standard amount and then point *b* returns to zero according to time constant $R_1C_1$ (while *a* returns according to $R_{10}C_{10}$ due to resistor 117 and condenser 115 where $R_{10}C_1<R_1C_1$). The time during which the potential of grid of tube 88 is lower than that of tube 89 depends on the instantaneous value of the red signal $E_R$ applied to terminal 125. But in the pair of tubes 88 and 89, either one or the other conducts through the resistor 123 to yield the standard current $V_0/4R$, depending whether grid of 88 or 89 is the highest. It is clear therefore that a square pulse of current will be sent by tube 89 through resistance $R_7$ 111, this pulse of current will be of standard intensity $V_0/4R$ and length proportional to the instantaneous value of $E_R$. It is clear also that a square wave will appear at point C or anode of tube 88. The anode of tube 88 is coupled to the grid of tube 90 through the network composed of the resistor 133 and the condenser 134 and the diode 129 which is connected in shunt with the resistor 133. It follows then that the rise of potential on the anode of tube 88 will not be transmitted on the grid of tube 90 because of the effect of the diode, while the decay of potential at point C will cause grid of tube 90 to drop by a standard amount and then return to zero with a time constant $R_1C_1$. Here again the tube pair 90 and 91 operate as tubes 88 and 89 and tube 91 will now deliver similarly a square pulse of current through resistance $R_7$ 111, of intensity $V_0/3R$ based on resistor 131 and having duration time proportional to the instantaneous value of the green signal $E_G$. A similar triggering action is now used from tube 90 to the tube pair 92 and 93, which delivers in turn a square pulse of current of intensity $V_0/2R$ based on resistor 137 and duration time proportional to the instantaneous value of the blue signal $E_B$. Again a similar triggering action is initiated by the decay of potential at point *g*, which initiates at point *h* a decaying pulse according to the time constant $R_{11}C_{11}$ due to resistor 147 and the condenser 149. This time constant is chosen to be a substantial fraction of T. The effect of the potential at point *h* on grid of tube 96 will be to force the standard current $V_0/R$ due to resistor 143 through tube 95 and force the beam on the blank space. The beam will remain there until a pulse 1 on the grid of tube 95 will cut off this tube. The decay of 1 coincides exactly with the end of the arresting saw-tooth from tube 96. There are no arresting or any other signals on the electrostatic plates 33 and 35 (except that due to the current of tube 87 which is in the nature of a bias) and the beam proceeds by the regular magnetic deflection. As the beam traverses the next signal strip a trigger pulse is initiated by the photosensitive tube 41 and the same train of events occurs again.

The circuit described here is illustrative of the required operations but obviously is by no means the only one possible. The operations described can be summarized as follows: An "arresting saw-tooth" is mixed with a "staircase." The staircase carries the luminance and chroma information, the arresting saw-tooth merely immobilizes the beam for short periods on the various color and blank strips. Both the sawtooth and staircase have a zero-signal period during which the beam, by regular deflection, traverses a signal strip. This initiates a trigger for the arresting saw-tooth and staircase modulating pulses. The system is non-synchronous, in that the controls are independent of the exact timing of the main deflection or of the 3.58 mc. oscillator.

Consider now the case when the gun is modulated by the luminance signal. It was shown that when the luminance signal is applied to the grid of the color kinescope 39, the signals $E_R/E_y$, $E_G/E_y$ and $E_B/E_y$ must be used to control the times of impingement of the beam on the strips R, G and B. This system has the possibility of giving a picture with better contrast.

The circuit 100 of FIGURE 8 can be used for this system with the following additions. The signals to the input terminals 125, 127 and 135 for the red, green, and blue signals, respectively, are now derived from three ratio circuits giving $E_R/E_y$, $E_G/E_y$ and $E_B/E_y$. Such circuits are well known. Particularly ingenious circuits have been disclosed in U.S. Patent 2,566,707 by Ramberg and Sziklai. Furthermore, a keying signal is required in the emitted light intensity to insure that the beam be bright and uniformly so when the beam traverses the signal trigger-producing strip. This can be done simply by deriving a signal from point $l$ of the arresting circuit 99. A slight lengthening of this pulse is preferable.

It is also possible to forego the ratio circuits and apply to the kinescope gun grid 32 not the full luminance signal, but merely a portion, as was described before. This may have the advantage of yielding the greater contrast possible by mixed gun and deflection modulation without the complication of the ratio circuits.

Figure 10:
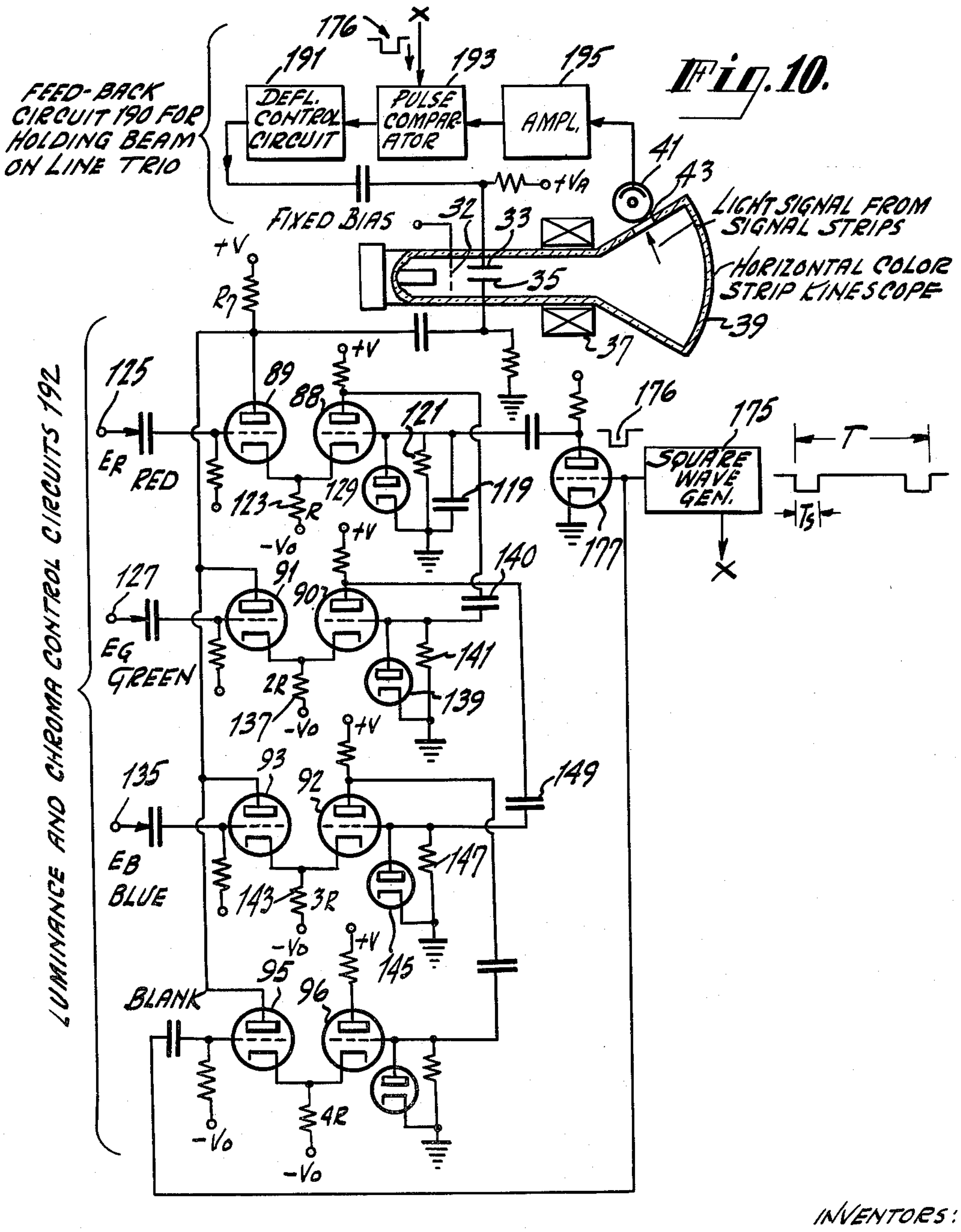

A circuit for use with horizontal color strips on the color kinescope is shown in FIGURE 10. The circuit has two distinct and essentially independent parts: the luminance and chroma control circuits 192 for modulation of luminance and chroma by deflection control and the feedback circuit 190 for keeping the beam on the quintet of lines—Red, Green, Blue, Blank, Signal Strip—such as are illustrated in FIGURE 4.

Let it be assumed to begin with that the horizontal deflection is perfectly registered with the lines on the screen. With zero electrostatic auxiliary deflection the beam is assumed to follow the signal strip edge. By applying staircase voltages to the electrostatic plates, with fixed heights of the steps but variable widths such as are illustrated in FIGURE 5, luminance and chroma control can be obtained. Circuits quite analogous to those used with vertical color strips can be used. A square wave generator 175 of fixed frequency generates negative square pulses 176 of duration $T_s$ which are used to drive the luminance and chroma control circuits 192. The amplifier 177 inverts the phase so that the end of the pulse $T_s$ triggers the red signal control tube pair 88 and 89 and produces a current pulse of intensity $V_0/R$ in resistance $R_7$ 111 of duration proportional to $E_R$, in the manner described in connection with FIGURE 8. The triggers proceed as before through the green, blue and blank signal producing pairs of current regulator tubes. The termination of the blanking step is determined by the beginning of the pulse $T_s$, since the square pulses from the local oscillator are fed to grid of tube 95.

Since the beam is of constant amplitude and stays constant periods of time $T_s$ on the signal strip, the average light received from the photosensitive tube 41 should remain constant. A feedback circuit 190 compares the output of the photosensitive tube 41 and the square wave generator 175 in the pulse comparator 193, which in turn supplies a control signal to the deflection control circuit 191, keeps the beam on the quintet of lines in spite of slight registry error, by making it dip during periods $T_s$ so that it intercepts partially the signal strip 53. The time constant of the feedback circuit need not be short as only slow correction need be applied if the horizontal deflection is nearly correctly registered. Note that the output of the photosensitive tube 48 may also be used to synchronize the square wave generator 175.

If the luminance signal is applied to the grid of the color kinescope 39, then the signals $E_R/E_y$, $E_G/E_y$ and $E_B/E_y$ are applied through appropriate ratio circuits to the input terminals 125, 127, 135 of the luminance and chroma circuits of FIGURE 10. In addition, the signal $T_s$ from the square wave oscillator is used to key the beam to standard full intensity during $T_s$ times to allow the feedback to function properly.

Some amount of luminance control plus keying during times $T_s$ can be applied to the grid of the color kinescope to increase contrast without the ratio circuits. It is also possible to use pure grid control, by applying a uniformly timed staircase to the beam deflection system of the color kinescope and applying the color signals at the right times on the grid of the color kinescope.

Having described the invention, what is claimed is:

1. The combination of a cathode ray image reproducer, said cathode ray image reproducer adapted to reproduce images in color, said cathode ray image reproducer including means for producing a scanning electron beam and a scanned image surface, said scanned image surface including component color phosphors, responsive to said scanning electron beam, a source of color information signals, scanning velocity modulating means coupled to said source including apparatus responsive to the amplitude of said color information signals for velocity modulating the scanning of said electron beam across each of said component color phosphors to cause each of said component color phosphors to emit colored light in accordance with said color information signals.

2. In a color image reproducing system, said color image reproducing system adapted to reproduce a predetermined color image described by a luminance component signal and by color component signals, said color image reproducing system including, means for producing a scanning electron beam and an electron sensitive image reproducing surface, said electron sensitive image reproducing surface including strips of component cathode luminescent materials, each of said component cathode luminescent materials corresponding to one of said color component signals, said component cathode luminescent materials arranged according to a prescribed arrangement, a source of such luminance and color component signals, means for causing said electron beam to move across each of said component cathode luminescent materials and means for causing the time interval spent by said scanning electron beam on each of said component cathode luminescent materials to be proportional to the amplitude of the color component signal corresponding to said component cathode luminescent material, said last-named means being coupled to said signal source and responsive to the magnitude of such color component signals.

3. A color image reproducing system adapted to reproduce a predetermined color image described by a luminance component signal and by color component signals, said color image reproducing system including, means for producing a scanning electron beam and an electron sensitive image reproducing surface, said electron sensitive image reproducing surface including segments of component cathode luminescent materials, each of said component cathode luminescent materials corresponding to one of said color component signals, said segments of component cathode luminescent materials arranged according to a prescribed arrangement, a source of such luminance and color component signals; deflection means for causing said beam to scan across said image reproducing surface; and means coupled to said source and responsive to the magnitude of said color component signals for velocity modulating the scanning of said electron beam across each of said component cathode luminescent materials to cause said scanning electron beam to remain on each of said component cathode luminescent materials for a period of time proportional to the absolute magnitude of the color component signal associated with said component cathode luminescent material.

4. A color image reproducing system adapted to reproduce a color image described by a luminance signal and by color component signals, said system comprising: an electron sensitive image reproducing surface including segments of component cathode luminescent materials arranged according to a prescribed arrangement, each of said segments corresponding to one of said color component signals and means for producing and directing a scanning electron beam toward said surface; a source of such luminance and color component signals; means coupled to said source for modulating the intensity of said electron beam in accordance with such luminance signal; a deflection system for causing said beam to scan across said surface; and means coupled to said signal source and to said deflection system for modulating the velocity of the scanning of said beam across said target in accordance with the relative magnitudes of such color component signals and in such manner that the time spent by said beam on a given segment of said surface is proportional to the relative magnitude of the color component signal corresponding to said given segment.

5. A color image reproducing system adapted to reproduce a color image described by a luminance signal and by color component signals, said system comprising: an electron sensitive image reproducing surface including segments of component cathode luminescent materials arranged according to a prescribed arrangement; each of said segments corresponding to one of said color component signals and means for producing and directing a scanning electron beam toward said surface; a source of such luminance and color component signals; a deflection system for causing said beam to scan across said surface; and means coupled to said signal source and to said deflection system for modulating the velocity of the scanning of said beam across said target in accordance with the relative magntiude of such color component signals and in such manner that the time spent by said beam on a given segment of said surface is proportional to the absolute magnitude of the color component signal corresponding to said given segment.

6. In a color kinescope system, the combination of, a color kinescope, a source of a color image signal containing luminance signal components and three color signal components, said color kinescope including a scanning electron beam and an electron sensitive color image surface containing repeating trios in the direction of scan of electron sensitive color-emitting component phosphors, the color light emitted by each of said color phosphors corresponding to one of said color signal components, said color image surface also including signal strips, means coupled to said signal strips for generating a synchronizing indexing signal, means for varying the color light output of said component color phosphors according to said color image signal comprising in combination electron beam scanning velocity modulation means, means coupling said color signal components and said indexing signal to said electron beam scanning velocity modulation means for causing said electron beam to impinge on each of said component color phosphors for a period proportional to the relative magnitude of the color signal component corresponding to said component color phosphors, and electron beam amplitude control means, responsive to said luminance signal and said color signal components for controlling the amplitude of said scanning electron beam.

7. The invention as set forth in claim 6 and wherein said component color phosphors are arrayed with non-electron-sensitive material, said non-electron sensitive material arrayed in areas of prescribed location and size with respect to the orientation of said component color phosphors, means for causing said electron beam to remain on said non-electron-sensitive materials for prescribed portions of scanning time corresponding to dark portions of said color image.

8. The invention as set forth in claim 7 and wherein said component color phosphors are arrayed with non-electron-sensitive materials, said non-electron-sensitive materials arrayed in areas of prescribed orientation and size with respect to the orientation of said component color phosphors, means for causing said electron beam to remain on said non-electron-sensitive materials for prescribed portions of scanning time corresponding to a time interval related to the total time interval required to scan a predetermined group of said component color phosphors.

9. In a cathode ray image reproducer, said cathode ray image reproducer responsive to component color signals and a luminance signal and adapted to reproduce images in color, said cathode ray image reproducer including a scanning electron beam and a scanning image surface, said scanning image surface including component color phosphors, component electron sensitive material groups and regions of non-electron-sensitive materials, said component color phosphors, component electron sensitive materials, and regions of non-electron-sensitive materials arranged in a predetermined array, means for scanning velocity modulating said scanning electron beam across each of said component color phosphors responsive to said component color signals and synchronizing the motion of said scanning electron beam comprising in combination, electron beam scanning velocity modulation means, an electron sensitive material responsive device, said electron sensititve materials responsive device responsive to the condition of said scanning electron beam striking said electron sensitive materials and including means to cause a reference signal, electron beam synchronizing means, said electron beam synchronizing means responsive to said synchronizing signal, said electron beam synchronizing means including apparatus for synchronizing the instantaneous position of said scanning electron beam with respect to the time of impinging on said component color phosphors, said electron sensitive component materials and said non-electron-sensitive materials, component-color-signals-scanning-electron-beam-control means, said component - colors - signals - responsive - scanning - electron-beam control means responsive to said component color signals and coupled to said electron beam scanning velocity modulation means and said electron beam synchronizing means whereby the velocity modulation of said scanning electron beam is caused to be synchronized in position with respect to each component color phosphor and to remain on each of said component color phosphors for periods proportional to the absolute magnitude of the component color signal corresponding to the particular component color phosphor.

10. In a cathode ray image reproducer, said cathode ray image reproducer responsive to component color signals and a luminance signal and adapted to reproduce images in color, said cathode ray image reproducer including a scanning electron beam and a scanning image surface, said scanning image surface including component color phosphors, component electron sensitive material groups and regions of non-electron-sensitive materials, said component color phosphors, component electron sensitive materials and regions of non-electron-sensitive materials positioned in a predetermined array, means for velocity modulating said scanning electron beam across each of said component color phosphors responsive to said component color signals and synchronizing the motion of said scanning electron beam comprising in combination, electron beam scanning velocity modulation means, an electron sensitive material responsive device, said electron sensitive materials responsive device responsive to the condition of said scanning electron beam striking said electron sensitive materials and including means to cause a reference signal, electron beam synchronizing means, said electron beam synchronizing means responsive to said synchronizing signal, said electron beam synchronizing means including apparatus for synchronizing the position of said scanning electron beam with respect to the orientation of said component color phosphors, said electron sensitive component materials and said non-electron-sensitive materials, component color signals responsive scanning electron beam control means, said component color signals responsive scanning electron beam control means responsive to said component color signals and coupled to the said electron beam scanning velocity modulation means and said electron beam synchronizing means whereby the velocity modulation of said scanning electron beam is caused to be synchronized in position with respect to each component color phosphor and to remain on each of said component color phosphors for periods proportional to the relative magnitude of the component color signal corresponding to the particular component color phosphors, scanning electron beam amplitude control means, said scanning electron beam amplitude means including apparatus whereby said scanning electron beam is amplitude modulated by said luminance signal.

11. The invention as set forth in claim 9 and wherein said means for scanning velocity modulating said scanning electron beam includes a pair of electrostatic deflection plates, said electrostatic deflection plates coupled to said component color signals responsive scanning electron beam control means whereby said electrostatic deflection plates are caused to produce the prescribed velocity modulation corresponding to each of said component color signals.

12. In a color television receiver, said color television receiver including apparatus for furnishing component color signals and a luminance signal, said color television receiver including a color kinescope, said color kinescope including a scanning electron beam, and an electron sensitive image reproducing surface, said electron sensitive image reproducing surface including a succession of strips of component color phosphors, said succession of strips of component color phosphors arrayed according to a prescribed pattern into groups, strips of electron sensitive light emitting material, means for locating said strips of electron sensitive light emitting material in a prescribed position with regard to said groups of strips of component color phosphors, said groups of strips of component color phosphors also designed to include non-electron-sensitive strips, said non-electron-sensitive strips arranged in a prescribed orientation with respect to said successive strips of component color phosphors and said electron sensitive light emitting strips, means for producing a color image corresponding to said component color signals and said luminance signal on said electron sensitive image reproducing surface comprising in combination, a scanning electron beam, electron beam timing means, said electron beam timing means including scanning electron beam deflection control apparatus whereby the color light output of each of said successive strips of component color phosphors to be proportional to the scanning velocity of a scanning electron beam on each of said strips of component color phosphors, component color signal conversion means, said component color signal conversion means including apparatus whereby said component color signals are transformed into scanning velocity modulation signals, each of said scanning velocity modulation signals corresponding to a light intensity associated with each of said successive strips of component color phosphors, scanning electron beam synchronizing means, said scanning electron beam synchronizing means including apparatus responsive to the condition of said scanning electron beam striking each of said electron sensitive light emitting material and designed to cause said scanning velocity modulation signals to be properly synchronized with the corresponding strip of said successive strips of component color phosphors, means for adjusting the scanning velocity modulation of said scanning electron beam on each of said successive strips of component color phosphors whereby the light output of each of said successive strips of component color phosphors is caused to be proportional to the corresponding component color signal thereby resulting in a color image corresponding to said component color signals and said luminance signal on said electron sensitive color image surface on said color kinescope.

13. The invention as set forth in claim 12 and wherein said scanning electron beam is caused to pause on said non-electron sensitive strips for intervals of time having a prescribed relationship to said velocity modulation signals.

14. The invention as set forth in claim 12 and wherein said scanning electron beam is caused to pause on said non-electron-sensitive strips prior to striking each of said electron sensitive emitting materials.

15. The invention as set forth in claim 12 and wherein the disposition of said strips of component color phosphors, said electron sensitive light emitting material, and said non-electron-sensitive strips is such that each strip of electron sensitive light emitting material is followed by said successive strips of component color phosphors in a prescribed location followed by a non-electron-sensitive strip.

16. The invention as set forth in claim 12 and wherein the arrangement of said strips of component color phosphors, said electron sensitive light emitting material and said non-electron-sensitive strips is such that each strip of electron sensitive light emitting material is followed by a non-electron-sensitive strip followed by said successive strips of component color phosphors in a prescribed location followed by another non-electron-sensitive strip.

17. The invention as set forth in claim 12 and wherein said scanning electron beam deflection control apparatus includes an auxiliary electron deflection apparatus included with said color kinescope.

18. The invention as set forth in claim 12 and wherein said scanning electron beam synchronizing means includes a photoelectric control device, said photoelectric control device responsive to emitted radiation caused by said scanning electron beam striking said electron sensitive light emitting material.

19. The invention as set forth in claim 12 and wherein said scanning electron beam synchronizing means includes a positively biased collector and an ultra-violet sensitive coating both of which may be utilized within said color kinescope with the photo current released by said ultra-violet sensitive coating responsive to the ultra-violet light emitted by said electron sensitive light emitting material, available for collection by said positively biased collector.

20. In a color television receiver, said color television receiver including apparatus for producing color image signals, said color television receiver including a color kinescope, said color kinescope including a scanning electron beam and an electron sensitive image reproducing surface, said electron sensitive image reproducing surface including groups of component color phosphors arrayed in a prescribed location with respect to a series of electron sensitive material strips, means for utilizing said electron sensitive material strips for sychronizing said scanning electron beam whereby said scanning electron beam is caused to traverse the surface of each of said component color phosphors at prescribed times and means for adjusting the period of impingement of said scanning electron beam at each of said prescribed times to a degree corresponding with the amplitude of the component color signal corresponding to said component color phosphor.

21. The invention as set forth in claim 20 and wherein said component color phosphor strips are arranged substantially perpendicular to the path of said scanning electron beam.

22. The invention as set forth in claim 20 and wherein said strips of component color phosphors are arranged substantially parallel to the mean path of said scanning electron beam.

23. The invention as set forth in claim 20 and wherein said color kinescope includes an auxiliary deflection system, said auxiliary deflection system coupled to the electron beam scanning velocity modulation means to cause the adjustment of the period of impingement of said scanning electron beam.

24. In a color television receiver, said color television receiver including apparatus for producing component color signals, $E_r$, $E_g$ and $E_b$ and a luminance signal $E_y$, said color television receiver including a circuit for producing signals of the type $k_1E_r/E_y$, $k_2E_g/E_y$, and $k_3E_b/E_y$, where $k_1$, $k_2$, and $k_3$ are predetermined constants, said color television receiver also including a color kinescope, said color kinescope including a scanning electron beam and electron sensitive image reproducing surface, said electron sensitive image reproducing surface including groups of component color phosphors arranged in a prescribed orientation with respect to a series of electron sensitive material strips, means for utilizing said electron sensitive material strips responsive to impact by said scanning electron beam for synchronizing the scanning motion of said scanning electron beam to cause said scanning electron beam to strike the surface of each of said component color phosphors at prescribed times, and means for controlling the scanning velocity of said scanning electron beam to cause said scanning electron beam to rest on prescribed component color phosphors for time intervals proportional to $k_1E_r/E_y$, $k_2E_g/E_y$, and $k_3E_b/E_y$ respectively, scanning electron beam amplitude control means, said scanning electron beam amplitude control means responsive to said luminance signal $E_y$ to control the amplitude of said scanning electron beam according to said luminance signal.

25. A color kinescope in a color television receiver, said color television receiver including apparatus for producing a prescribed sequence of component color signals and a luminance signal, each of said component color signals contributing to said luminance signal, said color kinescope including a scanning electron beam, an electron beam control grid and an electron sensitive image reproducing surface, said electron sensitive image reproducing surface including groups of component color phosphors arrayed in a prescribed sequence, and synchronizing signal electron sensitive strips, each of said groups of component color phosphors including one of said synchronizing signal electron sensitive strips, each component color phosphor of said groups of component color phosphors corresponding to one of said component color signals, synchronizing circuit means, said synchronizing circuit means including a photoelectric device responsive to the condition of said scanning electron beam striking each of said synchronizing signal electron sensitive strips and including apparatus for causing said scanning electron beam to strike the surface of each of said component color phosphors in synchronization with said prescribed sequence of component color signals, scanning velocity modulation means, said scanning velocity modulation means responsive to said component color signals and coupled to said synchronizing circuit means for causing said scanning electron beam to remain substantially at rest on each component color phosphor for a period of time proportional to the amplitude of the corresponding component color signal, and means for applying to said scanning electron beam control grid said luminance signal at a predetermined level in order to yield an increase in contrast.

26. In combination with a color kinescope in a color television receiver, said color television receiver including apparatus for receiving component color signals and a luminance signal, each of said component color signals contributing to said luminance signal, said color kinescope including a scanning electron beam, an electron beam control grid and an electron sensitive image reproducing surface, said electron sensitive image reproducing surface including strips of component color phosphors arrayed in a prescribed sequence, synchronizing signal electron sensitive strips, each of said groups of component color phosphors separated by one of said synchronizing signal electron sensitive strips, each of said groups of component color phosphors corresponding to one of said component color signals, synchronizing circuit means, said synchronizing circuit means including a photoelectric device responsive to the condition of said scanning electron beam striking each of said synchronizing signal electron sensitive strips and including apparatus for causing said scanning electron beam to explore the surface of each of said component color phosphors in synchronism with said prescribed sequence of component color signals, scanning velocity modulation means, said scanning velocity modulation means responsive to said component color signals and coupled to said synchronizing circuit means for causing said scanning electron beam to remain substantially at rest on each component color phosphor for a period of time proportional to the ratio of the contribution of the corresponding component color signal to the luminance signal, and means for applying said luminance signal to said electron beam control grid.

27. The invention as set forth in claim 26 and wherein the action of said scanning electron beam striking each of said synchronizing signal electron sensitive strips in conjunction with said photosensitive device produces a timing pulse from said photosensitive device.

28. The invention as set forth in claim 26 and wherein said strips of component color phosphors and said synchronizing signal electron sensitive strips are arrayed in an array so that they are substantially perpendicular to the scanning path of said scanning electron beam.

29. The invention as set forth in claim 26 and wherein said color kinescope includes a magnetic deflection system for normal scanning of said scanning electron beam, and wherein said velocity modulation means includes an electrostatic electron beam deflection control system, said electron beam deflection control system yielding independent scanning velocity modulation control of said scanning electron beam.

30. In combination with a line screen color kinescope in a color television receiver, said color television receiver adapted to receive component color signals and also luminance information, said line screen color kinescope including a scanning electron beam and a line screen, said line screen including strips of component color phosphors arrayed in a prescribed sequence, said strips of component color phosphors arranged in groups, each of said groups including a synchronizing signal electron sensitive strip, each of said synchronizing signal electron sensitive strips adapted to yield a light of predetermined spectral characteristics responsive to the condition of said scanning electron beam striking each of said synchronizing signal electron sensitive strips, non-electron-sensitive strips, said non-electron-sensitive strips included with each of said groups in between said synchronizing signal electron sensitive strips according to a predetermined arrangement, means for causing said scanning electron beam to scan in a direction substantially parallel to each of said component color phosphors, a staircase voltage generator, said staircase voltage generator including apparatus for causing said scanning electron beam to travel successively along each of said strips of component color phosphors according to a prescribed sequence, electron beam scanning velocity control and synchronizing means, said electron beam scanning velocity control and synchronizing means including a photosensitive device, said photosensitive device responsive to the light from said synchronizing signal electron sensitive strips, said electron beam scanning velocity control and synchronizing means also including a deflection system which can be used for scan-velocity control of said scanning electron beam, said electron beam scanning velocity control and synchronizing means including apparatus for causing said scanning electron beam to be synchronized along each step path with said prescribed sequence of component color image signals and for causing said scanning electron beam to travel along each of said component color phosphor strips for a time proportional to the amplitude of said component color signal.

31. In combination with a line screen color kinescope in a color television receiver, said color television receiver adapted to receive component color signals and also luminance information, said line screen color kinescope including scanning electron beam and a line screen, said line screen including strips of component color phosphors arrayed in a prescribed sequence, said strips of component color phosphors arranged in groups, each of said groups separated by a synchronizing signal electron sensitive strip, each of said synchronizing signal electron sensitive strips adapted to yield a light of predetermined spectral characteristics responsive to the condition of said scanning electron beam striking each of said synchronizing signal electron sensitive strips, non-electron-sensitive strips, said non-electron-sensitive strips included with each of said groups in between said synchronizing signal electron sensitive strips according to a predetermined arrangement, said scanning electron beam adapted to scan in a direction substantially parallel to each of said component color phosphors, a staircase voltage generator, said staircase voltage generator including apparatus whereby said scanning electron beam is caused to travel successively along each of said strips of component color phosphors according to a prescribed sequence, electron beam scanning velocity control means, said electron beam scanning velocity control and synchronizing means including a photosensitive device, said photosensitive device responsive to the light from said synchronizing signal electron sensitive strips, said electron beam scanning velocity control and synchronizing means also including a deflection system which can be used for scan velocity control of said scanning electron beam, said electron beam scanning velocity control and synchronizing means including apparatus whereby said scanning electron beam is caused to be synchronized along each step path with said prescribed sequence of component color image signals and whereby said scanning electron beam is caused to travel along for the time proportional to the ratio of the contribution of the luminance of the corresponding component color signal to the luminance signal, and means for amplitude modulating said scanning electron beam responsive to said luminance signal.

32. The invention as set forth in claim 30 and wherein means are provided for adjusting the intensity of said scanning electron beam to above a predetermined level during the time that said scanning electron beam strikes said synchronizing signal electron sensitive strips.

33. The invention as set forth in claim 30 and wherein said scanning electron beam is caused to traverse each of said non-electron-sensitive strips for a period of time bearing a prescribed relationship to the time which said scanning electron beam traverses each of said component color phosphors in one of said groups.

34. The invention as set forth in claim 30 and wherein a feedback circuit is utilized, said feedback circuit coupled between said staircase wave generator and said photosensitive device to cause said scanning electron beam to remain on said group of component color phosphors except during a prescribed time interval during which said scanning electron beam intercepts said synchronizing signal electron sensitive strips, said feedback circuit including means to control the deflection of said scanning electron beam whereby said scanning electron beam only partially intercepts said synchronizing signal electron sensitive strips.

35. In combination, a line screen color kinescope in a color television receiver, said color television receiver including apparatus for receiving component color signals and also luminance information, said line screen color kinescope including a scanning electron beam and groups of component color phosphor strips, each of said groups of component color phosphor strips preceded by a synchronizing signal electron sensitive strip, said synchronizing signal electron sensitive strips adapted to yield light output of prescribed spectral nature during the condition when said scanning electron beam strikes said synchronizing signal electron sensitive strip, each of said groups of component color phosphors including strips of non-electron-sensitive areas according to a prescribed array and sequence, a magnetic deflection system for causing said scanning electron beam to traverse a path perpendicular to the direction of each of said component color phosphors, said line screen color kinescope also including an auxiliary deflection control means, photosensitive device means, synchronizing circuit means, said synchronizing circuit means coupled between said photosensitive device means and said auxiliary deflection system means for causing the motion of said scanning electron beam to be responsive to said component color signals and to synchronizing signals based on the condition of said scanning electron beam striking each of said synchronizing signal electron sensitive strips and means including said auxiliary deflection control means and responsive to said synchronizing signal for causing said scanning electron beam to traverse each of said component color phosphors in one of said groups according to a prescribed timing dependent on said component color signals and for causing said scanning electron beam to remain on successive component color phosphors for periods proportional to the absolute magnitude of the corresponding component color signal.

36. In a combination, a line screen color kinescope in a color television receiver, said color television receiver including apparatus for receiving component color signals and also luminance information, said line screen color kinescope including groups of component color phosphor strips, each of said groups of component color phosphor strips preceded by a synchronizing signal electron sensitive strip, said synchronizing signal electron sensitive strips adapted to yield light output of prescribed spectral nature during the condition when said scanning electron beam strikes said synchronizing signal electron sensitive strip, each of said groups of component color phosphors including strips of non-electron-sensitive areas according to a prescribed array and sequence, a magnetic deflection system for causing said scanning electron beam to traverse a path perpendicular to the direction of each of said component color phosphors, said line screen color kinescope also including an auxiliary deflection control means, photosensitive device means, synchronizing circuit means, said synchronizing circuit means coupled between said photosensitive device means and said auxiliary deflection system means for causing the motion of said scanning electron beam to be responsive to said sequence of component color signals and to synchronizing signals based on the condition of said scanning electron beam striking each of said synchronizing signal electron sensitive strips and means including said auxiliary deflection control means and responsive to said synchronizing signals for causing said scanning electron to traverse each of said component color phosphors in one of said groups according to said sequence of component color signals and also according to a prescribed timing for causing said scanning electron beam to remain on successive component color phosphors for periods proportional to the relative magnitude of the component color signal, scanning electron beam amplitude control means, said scanning electron beam amplitude control means including apparatus for varying the amplitude of said scanning electron beam in accordance with said luminance information.

37. The invention as set forth in claim 35 and wherein said synchronizing circuit means includes a spot arrester circuit, said spot arrester circuit including apparatus to arrest said scanning electron beam for a prescribed interval of time by counter effecting the effect on said scanning electron beam by said magnetic deflection system, said synchronizing circuit means also including a beam scan velocity control circuit, said beam scan velocity control circuit responsive to said component color signals to provide scanning beam velocity control signals according to a predetermined relationship with respect to the amplitude of said component color signals.

38. An electron beam scanning velocity control system, said electron beam scanning velocity control system including a kinescope, said kinescope including a scanning electron beam image face and a first electron beam deflection system, said first electron beam deflection system designed to yield a first prescribed scanning motion of said scanning electron beam, an arrester circuit, a second deflection system, said arrester circuit coupled to said second deflection system and adjusted to arrest said scanning electron beam for a prescribed period by counter effecting the influence of said first deflection system, an electron beam deflection control system, said electron beam deflection control system coupled to said second deflection system and responsive to a set of component signals, said electron velocity control system including a series of cascaded pulse decay and triggering circuits, each of said pulse, decay and triggering circuits adjusted to convert one of said component signals into substantially a pulse of proportioned height and including a decay circuit whereby said pulse is caused to decay according to a prescribed rate, said decaying pulse adapted to control the deflection of said scanning electron beam according to the said proportional amplitude of said pulse and, said pulse decay and trigger circuit then adjusted to trigger on the succeeding pulse decay and trigger circuit when said decaying pulse achieves a predetermined amplitude, said succeeding pulse decay and triggering circuit responsive to a second of said component signals and designed to yield electron deflection control proportional to the amplitude of said component signal during the interval between the time when said succeeding pulse decay and triggering circuit is turned on to the time when it triggers the next succeeding pulse decay and trigger circuit.

39. Color-image-reproducing apparatus for a color-television receiver comprising: circuit means for supplying a signal component primarily representative of the luminance of a composite color image to be reproduced and a signal component primarily representative of the color of the image to be reproduced; cathode-ray image-reproducing means having cathode-ray beam-intensity control means coupled to said supply circuit means and responsive to said luminance-signal component and having a display screen comprising color elements and including indexing means for developing an indexing signal representative of the scanning of said color elements by the cathode-ray beam; and circuit means coupled to said cathode-ray image-reproducing means for effecting scanning of said color elements by said cathode-ray beam and responsive to said indexing signal for controlling the relation of the scanning of said color elements and the color repetition of said color signal component and responsive to said color signal component for varying the scanning in accordance with the color of the image to be reproduced to develop a composite color image.

References Cited in the file of this patent

UNITED STATES PATENTS

| | | |
|---|---|---|
| 2,657,257 | Lesti | Oct. 27, 1953 |
| 2,713,606 | Sziklai | July 19, 1955 |
| 2,773,118 | Moore | Dec. 4, 1956 |
| 2,798,114 | Schlesinger | July 2, 1957 |

FOREIGN PATENTS

| | | |
|---|---|---|
| 427,630 | Great Britain | Apr. 15, 1935 |
| 483,935 | Great Britain | Apr. 28, 1938 |